Aug. 29, 1967　　　　　J. E. CLIFFORD　　　　　3,338,807
METHOD AND APPARATUS FOR ELECTROCHEMICAL MACHINING WHEREIN
THE WORKPIECE FUNCTIONS AS A BIPOLAR ELECTRODE
Filed March 22, 1962　　　　　　　　　　　　　　　　3 Sheets-Sheet 1

INVENTOR.
JOHN E. CLIFFORD
BY Bosworth, Sessions,
Herrstrom & Knowles
ATTORNEYS

INVENTOR.
JOHN E. CLIFFORD
BY Bosworth, Sessions,
Herrshow & Knowles
ATTORNEYS

INVENTOR.
JOHN E. CLIFFORD
BY Bosworth, Sessions,
Herrstrom & Knowles
ATTORNEYS 3,338,807
METHOD AND APPARATUS FOR ELECTROCHEMICAL MACHINING WHEREIN THE WORKPIECE FUNCTIONS AS A BIPOLAR ELECTRODE
John E. Clifford, Columbus, Ohio, assignor, by mesne assignments, to The Steel Improvement and Forge Company, Cleveland, Ohio, a corporation of Ohio
Filed Mar. 22, 1962, Ser. No. 181,717
24 Claims. (Cl. 204—143)

This invention relates to the electrolytic erosion of conductive material to provide predetermined forms, shapes or surfaces therein and more particularly to electrolytic machining operations such as shaping objects of complex or intricate forms, die sinking, cutting, turning, grinding, milling and drilling. In some respects, the present invention constitutes improvements over the inventions disclosed and claimed in the copending patent applications of Charles L. Faust and John A. Gurklis, Ser. No. 855,873, filed Nov. 27, 1959, now Patent No. 3,095,364, for "Material Removal," and of Charles L. Faust and John E. Clifford, Ser. No. 855,678, filed Nov. 27, 1959, now Patent No. 3,130,138, for "Electrolytic Cutting."

Electrolytic machining operations are coming into extensive use in situations where one or more of the following factors may be present: (1) The article to be produced, such as a turbine blade or a die cavity, has a form or shape that is difficult to produce by conventional methods. (2) The article is composed of a material that is difficult to machine by conventional methods. (3) It is important that the articles be free from the strains or deformations that may result from conventional machining operations. (4) The articles are so small or of such shape that machining by conventional method is difficult, if not impossible.

In order to attain high rates of material removal in electrolytic machining operations, high current densities are required. One manner in which high current densities can be achieved and accurate machining operations carried out is by very close spacing between the work and the electrode tool and rapid circulation of electrolyte in the gap between the work and the tool. The high current density is necessary for advantageous rapid material removal in accordance with Faraday's law, but it has presented difficulties particularly in cases where the surface to be machined is large with respect to the cross sectional area of the work piece available for conduction of electricity to the surface being machined from an external source of current. Similar difficulties occur where large amounts of current must be conducted by tools of relatively small cross section or where rotating tools are employed.

In the usual electrolytic machining operation, the tool is the cathode, the work piece is the anode, and both the tool and the work piece are connected to the required source of current by conventional solid conductors. According to the present invention the difficulties incident to this type of operation are eliminated by utilizing an electrolytic system embodying at least three electrodes and in which at any given instant one electrode is the cathode and is connected by electronic conducting means of the current source, another electrode is the anode and is connected by electronic means to the current source, and a third electrode is a bipolar electrode, i.e., is simultaneously both anode and cathode, and is without any direct electronic or solid conductor connection to the current source. The bipolar electrode may be either the work piece or the tool and preferably the direction of current flow through the system is periodically reversed so that the surfaces of the bipolar electrode in contact with the electrolyte are alternately anode and cathode. With this arrangement, as explained below, it becomes possible simultaneously to machine two opposed faces of a turbine blade, for example, or to employ a single tool to perform two separate machining operations such as two die sinking or cutting off operations.

A general object of the invention is the provision of improved methods and apparatus for electrolytic machining embodying a bipolar electrode. Other objects and advantages of the invention will become apparent from the following description of preferred forms thereof, reference being made to the accompanying drawings in which:

FIGURE 1 is an elevational view, somewhat diagrammatic, illustrating an apparatus for carrying out the invention as applied to the machining of turbine blades and the like;

Figure 1:
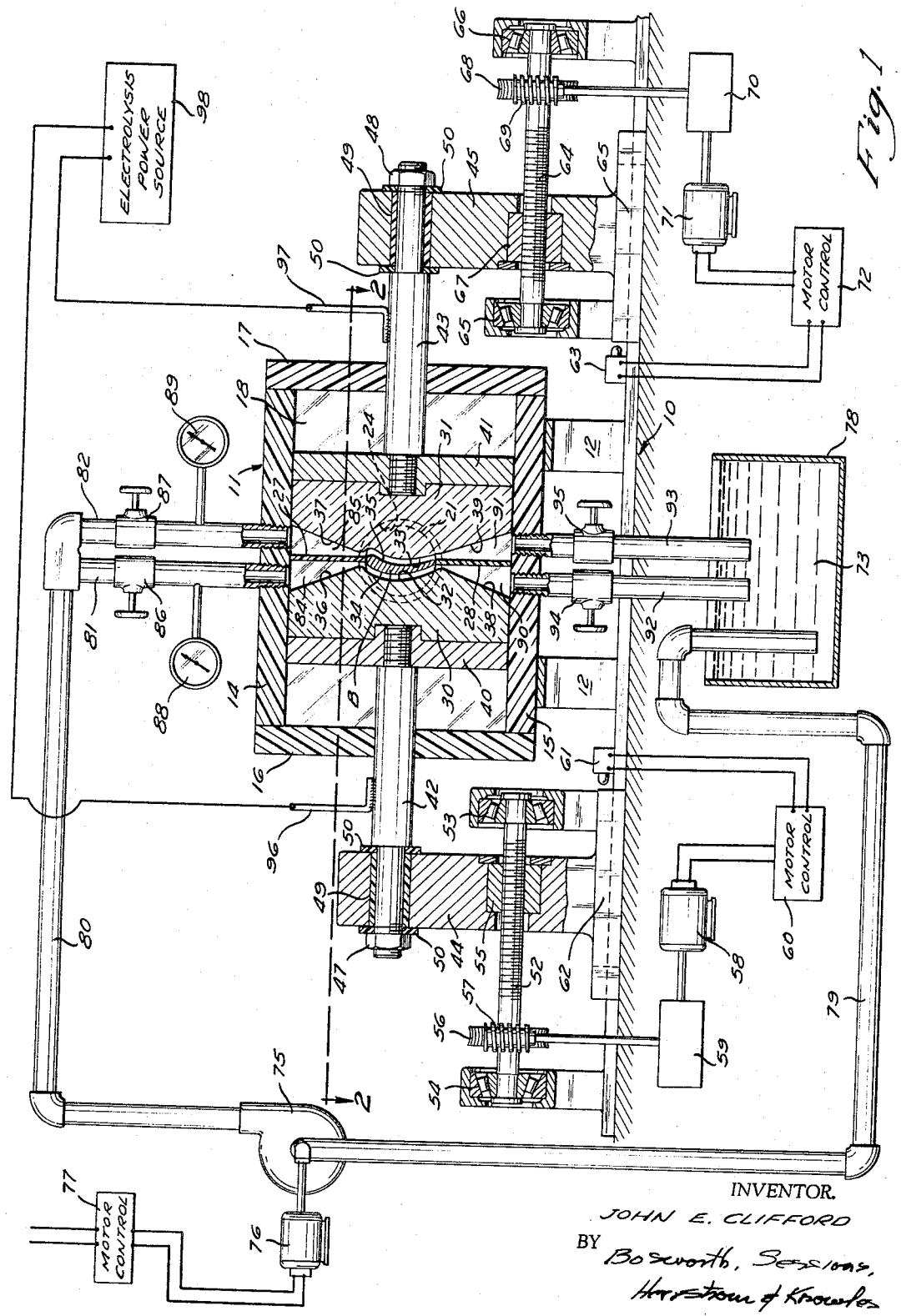
Figure 2:
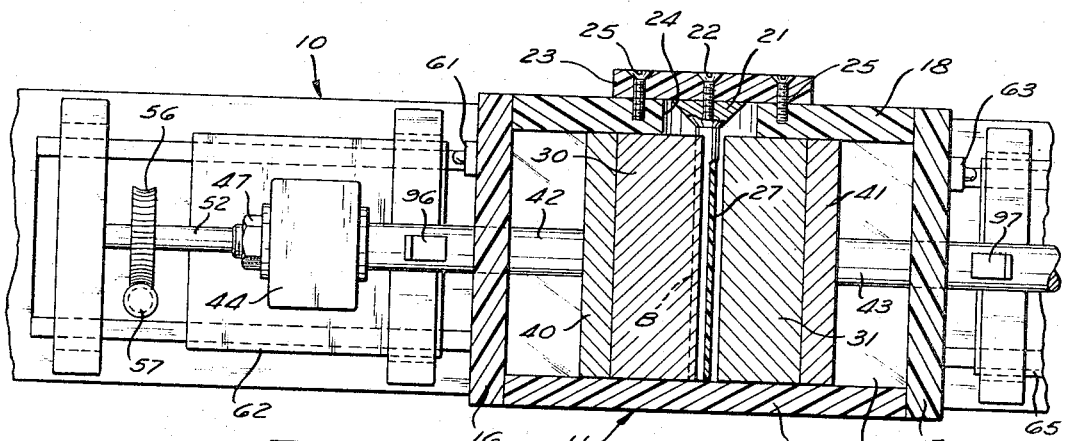
FIGURE 2 is a plan view, partly in section, of the apparatus shown in FIGURE 1, the view being taken as indicated by lines 2—2 of FIGURE 1.

FIGURES 1 and 2 of the drawings illustrate diagrammatically an apparatus for electroshaping turbine blades and the like. This illustration is used as an example for the reason that a turbine blade presents a particularly difficult problem in electromachining because of the large area to be shaped in comparison to the rather small cross section of the blade for electronic current flow. In the past it has been necessary to weld a current conductor to the base or root portion of the blade blank in order to supply the current to the blade for carrying out the machining operation. This has imposed a severe limitation on the rate at which machining can be carried out and on the size of the blades that can be machined at reasonable speeds, because it has not been possible to supply sufficient current to the blank. In many electrolytic machining operations average current densities should be at least 50 amperes per square inch. At this current density, a blade having an area of 50 square inches on each side would require a current of 5,000 amperes to machine both sides of the blade simultaneously. This is simply too great a current for the usual welded connection to one end of the blade and the flow of such a current longitudinally of the blade also would result in excess $I^2R$ losses and heating of the blade. The apparatus and method of the present invention eliminate these difficulties by making it unnecessary to make a direct connection to the tool blank. Thus, large currents can be employed without difficulty.

As shown in FIGURES 1 and 2, a preferred form of the apparatus may consist of any convenient support providing a bed or base 10, upon which a cell, indicated in general at 11 and within which the electrolysis takes place, is supported as by brackets 12. The cell is a rectangular box that is preferably built up of sheets of a transparent plastic insulating material. The box comprises top and bottom plates 14 and 15, end plates 16 and 17, and side plates 18 and 19. A work piece, shown herein as a turbine blade blank B, is supported within the cell in any convenient manner. For example, the base portion 21 of the blank may be secured as by a screw 22 to a closure member 23 that in turn is secured to side wall 18 to close the opening 24 therein. Screws 25 may be employed to secure the closure member 23 to the sidewall 18. The blade B extends completely across the cell in the form of the invention illustrated. Thus the cell is, in effect, divided into two halves by the blade and by partition members 27 and 28 which engage the top and bottom edges of the blade blank B respectively and which are supported in any suitable manner by the side walls of the cell 11.

Current is supplied to the cell by electrode tools 30 and 31. The tools are slidably mounted in the cell and have active faces 32 and 33, respectively, that are formed with three dimensional contours or shapes that are complementary to the contours and shapes to be formed on the sides 34 and 35, respectively, of the blade blank B. The tools also preferably have entry surfaces 36 and 37 and discharge surfaces 38 and 39, respectively, that guide the electrolyte to and from the working zones between the working faces 32 and 33 of the respective tools and the surfaces 34 and 35 of the work piece to be machined. These surfaces may be masked with a non-conductive coating, if desired, in which case it may be possible in some instances to eliminate the partitions 27 or 28.

To provide for advancing and retracting the tools 30 and 31, the tools are attached to tool backing plates 40 and 41, respectively, which in turn are secured to rods or shanks 42 and 43. The tool shanks 42 and 43 are secured to slidable mounting blocks 44 and 45 as by nuts 47 and 48, and are insulated therefrom by insulating sleeves and washers 49 and 50.

In order to advance and retract the tools toward and away from the work, the mounting blocks 44 and 45 are slidably mounted on guideways on the bed 10 of the apparatus. Any convenient means may be employed for advancing the tools toward the work at the desired rate. As shown in the drawing, in the present embodiment the tool block 44 is advanced by means of a screw 52 which is supported by suitable bearings 53 and 54 and which engages a nut 55 secured within an opening in the tool block. Worm wheel 56 is secured to one end of the screw and the worm wheel is driven by a worm 57 which in turn is driven by a motor 58 through a speed reducer 59. The motor is controlled by a conventional speed and reversing control 60 which may be adjusted to advance or retract the tool at the desired speed. A limit switch in the form of a microswitch 61 is preferably adjustably mounted on the bed 10 of the apparatus in a position to be engaged by the base 62 of the mounting block 44. When the switch 61 is engaged by the base 62 the motor is automatically stopped and if desired may be reversed to back the tool away from the work piece.

A similar arrangement is provided for advancing and retracting the mounting block 45. This consists of a screw 64 carried by bearings 65 and 66 and engaging a nut 67 disposed within an opening in the mounting block. The screw is driven by a worm wheel 68, worm 69, speed reducer 70, and motor 71. The motor 71 is controlled by a conventional speed and reversing control 72, and as before a limit switch 63 is adjustably mounted on the bed 10 in a position to be engaged by the base 65 of the mounting block 45 when the tool has advanced to the desired degree, whereupon the motor control shuts off or reverses the motor and stops or reverses the tool. The controls are supplied with electric power from any convenient source.

To circulate electrolyte 73 under pressure and at high velocity through the cell and particularly through the narrow gap between the working faces 32 and 33 of the tools 30 and 31 and the surfaces 34 and 35 of the work piece, a pump 75 is provided, driven by a motor 76 that is controlled by a speed control 77. Pump 75 pumps the electrolyte from a sump 78 through conduits 79 and 80 to conduits 81 and 82 that lead to entry zones 84 and 85 on opposite sides of the partition 27. The conduits 81 and 82 are provided with valves 86 and 87 so the rates of flow through the conduits can be adjusted and balanced if desired. Pressure gauges 88 and 89 are preferably connected to the conduit between the valves and the cell 11.

From the entry zones 84 and 85 the electrolyte distributes itself longitudinally of the work piece and flows at high velocity through the gap between the work piece and the active surfaces 32 and 33 of the electrode tools. The electrolyte then flows into discharge chambers 90 and 91 provided by the shape of the electrode tools and thence to discharge conduits 92 and 93 which lead to sump 78.

Conduits 92 and 93 preferably are provided with flow control valves 94 and 95, respectively, to make it possible to control the rate of flow of electrolyte through the separate sides of the cell and to control the back pressure of the electrolyte within the cell. The pressures on the two sides of the cell are preferably approximately balanced so that there will be no substantial hydraulic forces tending to displace laterally the work piece B or the partitions 27 and 28.

Current for the electrolysis is supplied to the tools 30 and 31 through conductors 96 and 97 which are welded or otherwise suitably secured to the tool shanks 42 and 43, the tool shanks 42 and 43 are connected to the plates 40 and 41 which in turn are connected to the tools 30 and 31. As indicated diagrammatically in the drawing, conductors 96 and 97 lead to a power source 98. The conductors 96 and 97 are in part flexible to permit movement of the tools and are of appropriate size to carry the heavy currents involved. The power source 98, as explained below, may take various forms, but in general it is a low voltage, heavy current source. For the particular operation shown in FIGURES 1 and 2, wherein two sides of a turbine blade are being simultaneously machined the source may consist of an adjustable voltage DC supply, such as a rectifier or DC generator with a switching means for reversing the flow of current at predetermined, adjustable intervals, or it may consist of a source of single phase AC of commercial frequency such as 60 cycles. For some operations where only one side of a work piece is to be machined at a time, a variable voltage DC source may be employed.

It will be noted that the apparatus illustrated in FIGURES 1 and 2 described above is designed for great flexibility in operation. Thus, the speeds and distances of advance of the two tools can be separately controlled by the controls 60 and 72 and the limit switches 61 and 63. The total volume of electrolyte forced through the system can be controlled by controlling the speed of the pump 75 through adjustment of the speed of motor 76, while the valves 86 and 87 in the inlet conduits and the valves 94 and 95 in the discharge conduits from the cell 11 provide for individual control of the rates of flow and of the pressure on opposite sides of the work piece. Also, if desired, each motor can be controlled simultaneously with the power source 98 to advance its respective tool only during the half cycles when the tool is the cathode in the cell.

Figure 3:
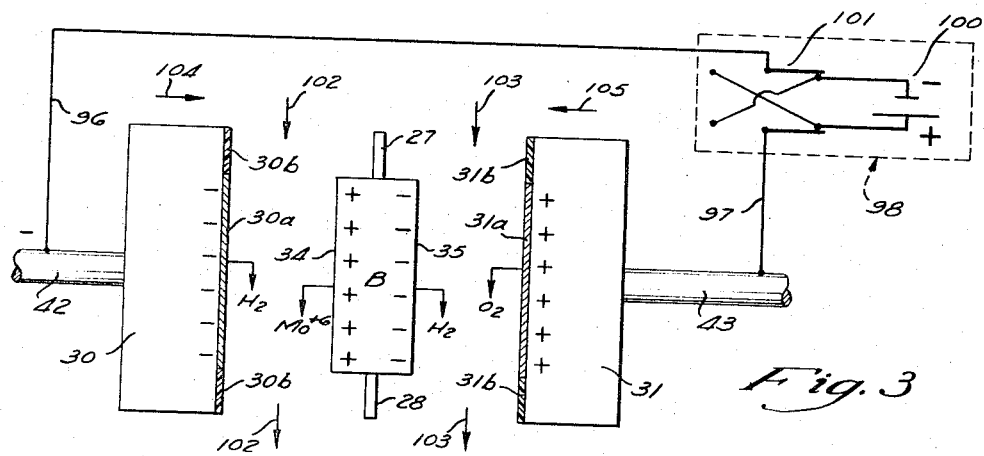
FIGURES 3 and 4 are diagrams illustrating the electrolytic actions that take place in an apparatus such as that shown in FIGURE 1.
Figure 4:
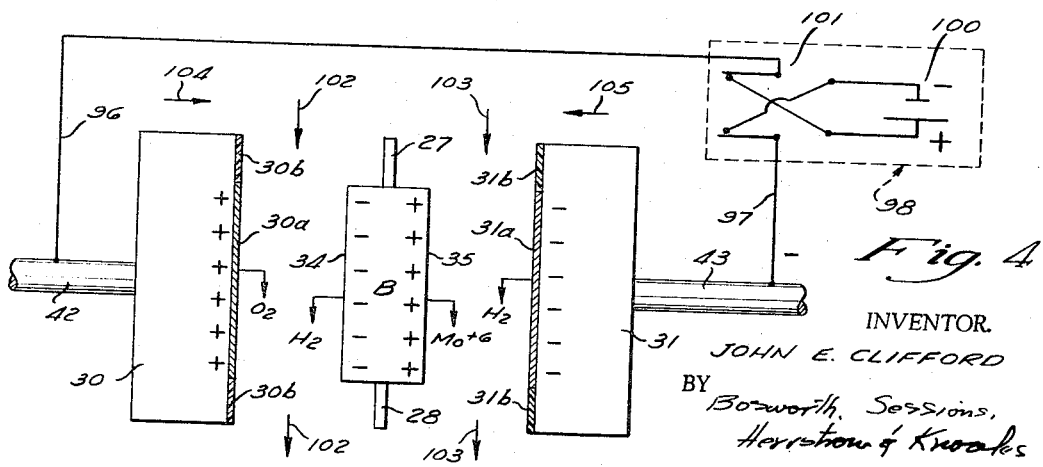

FIGURES 3 and 4 of the drawings diagrammatically illustrate the principles of operation of the invention as applied to the simultaneous machining of two sides of a work piece such as a turbine blade in an apparatus of the general type shown in FIGURES 1 and 2. Where applicable, in these figures as used in FIGURES 1 and 2 the same reference characters have been used for corresponding parts. Here the power source 98 consists of a DC source 100 and a reversing switch 101 by means of which the DC source 100 is connected to the conductors 96 and 97 leading to the tools 30 and 31, respectively. The tools 30 and 31 are made of any suitable or convenient electrically conductive material, but at least the surfaces of the tools should be composed of materials, indicated as layers 30a and 31a, that do not dissolve chemically or anodically in the electrolyte that is caused to flow on opposite sides of the blade blank B as indicated by the arrows 102 and 103. The streams of electrolyte are separated by the work piece B and the partitions 27 and 28 so that any path for the flow of current directly from tool 30 to tool 31 through the electrolyte will be of substantially higher resistance than the flow through the work piece B. As noted above, the portions of the tools beyond the working faces thereof may be masked by insulating layers 30b and 31b, if desired. The flowing electrolyte contacts the surfaces 34 and 35 of the work piece and as material is removed electrolytically from the work piece the tools 30 and 31 are advanced toward the work piece as indicated by the arrows 104 and 105.

During the half cycle of the operation illustrated in FIGURE 3, the tool 30 is the cathode and the surface 34 of the work piece B becomes an anode with respect to tool 30 as indicated in the drawing. Also, as indicated in the drawing the opposite face 35 of work piece B then is a cathode and the surface of the tool 31 is the anode for the entire electrolytic cell. Thus, the tool 30 is the cathode, the tool 31 is the anode and the work piece is a bipolar electrode with its surface 34 acting as an anode and its surface 35 acting as a cathode. During this portion of the cycle the surface 34 of the work piece B dissolves anodically and as the tool 30 closely approaches the surface of the work piece the surface of the work piece assumes the configuration of the adjacent face of the tool 30. Assuming, for example, a blank or work piece B composed of molybdenum and an electrolyte composed of sodium hydroxide, then hydrogen is formed at the surface of the tool 30 while the metal of the surface 34 of the blank is anodically dissolved and probably goes into solution as $Mo^{+6}$.

FIGURE 4 illustrates the action that takes place when the current is reversed, the reversing switch 101 being shown in the opposite position. Under these conditions the tool 30 becomes the anode of cell while the tool 31 is the cathode. The work piece or turbine blade blank B remains a bipolar electrode but the surface 34 thereof becomes a cathode surface while the surface 35 becomes an anode and is eroded. Again, assuming the same molybdenum blank and sodium hydroxide electrolyte, the molybdenum is removed and goes into the solution on the anode side 35 of the work piece, hydrogen is evolved on the cathode side 34, oxygen is evolved on the surface of the anode 30 and hydrogen at the surface of the cathode 31. The operation proceeds as during the previous half cycle except that the erosion of the work piece takes place on surface 35 rather than on surface 34.

The reversing switch 101 may be a conventional mechanical switch operated by a motor in accordance with a predetermined time cycle or an electronic switch device also operated in accordance with a predetermined time cycle. If both tools are advanced continuously toward the work for the sake of convenience of operation, the half cycle time should not be so great that during the half cycle when a tool is the anode that tool will approach too closely to the work piece surface that at the time is a cathode and is not being eroded. For example, if the average rate of erosion and advance of the tools is 0.006 inch per minute, then a half cycle time of 10 seconds will result in closing the gap between electrode and tool 0.001 inch during the inactive half cycle; and this amount is not excessive. Also, it appears probable that at least with some materials too high a frequency may result in inefficient operation because of actions in the solution that are not entirely understood and because of possible inductance and capacitance effects in the electrolytic cell. Frequencies that have been used successfully range from three cycles per minute, i.e., half cycles having a duration of 10 seconds, to ordinary 60 cycle alternating current. The use of 60 cycle AC is advantageous because of a reduction in equipment costs since only a variable voltage transformer is required to produce the electrolysis current. If the tools are advanced only during the half cycles when they are cathodes, then the half cycles can be greatly lengthened if desired.

It would ordinarily be expected that reversal of current would result in deposition of metal on a surface of the work piece during the half cycles that the surface is the cathode of the bipolar electrode. However, by carrying out the operation under the proper conditions and with proper electrolytes for given materials it has been found that the cathodic deposition of metal on the work piece from the electrolyte can be minimized if not entirely eliminated; also, if any metal is deposited on a work piece surface when the surface is a cathode, that deposit is removed early in the next half cycle when the surface again becomes an anode.

As mentioned, the selection of electrolytes for specific materials is important with respect to preventing deposition of metal during the half cycle when the work piece surface is a cathode. Thus, for molybdenum, tungsten and similar metals simple alkaline electrolytes are suitable; a solution of 150 grams per liter of sodium hydroxide in water gives excellent results. The metal dissolved from the work piece apparently reacts with the electrolyte to form sodium molybdate or sodium tungstate as the case may be, but molybdenum and tungsten cannot be plated out of solutions of this character.

Another factor that controls the plating out of the metal onto the work piece during the cathodic half cycle is the concentration of the metal ions in the electrolyte adjacent the surface. According to the present invention, the electrolyte is cause to flow over the surface that is being machined at a high rate of speed and under a positive gauge pressure. Speeds of the order of 20 to 250 feet per minute and pressures of at least 5 lbs. per square inch gauge are preferred. Under these conditions the electrolyte is rapidly replenished at the surface where the electrolysis takes place and fresh electrolyte is constantly being supplied. Thus, even with metals that would tend to replate, the replating can be kept to a minimum by circulation of the electrolyte and by replenishing the electrolyte otherwise treating it to maintain the concentration of metallic ions of the metal being machined below a value at which the metal will replate at any substantial speed. For example, with work pieces composed of iron, a simple aqueous solution of sodium chloride can be used as an electrolyte, in which case the iron that goes into solution reacts to form a gelatinous precipitate of ferrous hydroxide that can be permitted to settle out of this electrolyte solution in a sump or the like. In this manner the concentration of iron in the solution can be kept below a value at which plating at any substantial speed will take place. Thus, contrary to expectation, the reversal of current flow does not prevent anodic dissolution from taking place. Similarly, if there is any plating out on the tools when they are cathodes, the deposits are immediately removed when the tools become anodes again.

As mentioned above, the bipolar electrode principle can be utilized with direct current. Assume, for example, that it is desired to machine only the surface 34 of the work piece B in FIGURE 1. To accomplish this, the switch 101 of FIGURE 3 is placed in the position shown so that direct current is supplied to the electrolytic cell. The electrode tool 30 is then the cathode at all times. The work piece B is the bipolar electrode and has its surface 34 acting as its anode and its surface 35 as a cathode. The electrode tool 31 then becomes an anode but since it is always an anode and the surface 35 is always a cathode no erosion of the surface 35 takes place and the tool 31 can have any convenient configuration that is not necessarily related to the shape of the work piece 35. The operation in such case then proceeds in the manner described with reference to FIGURE 3, the tool 30 being advanced toward the work but the tool 31 remaining stationary with the motor 71 stopped. Electrolyte is circulated as before between the tool 30 and the surface 34, as it is this surface where the electrolytic erosion takes place. Preferably, electrolyte is also circulated between the tool 31 and the work surface 35 because the rapid circulation of electrolyte carries away the gases that might otherwise accumulate on the surfaces of the work piece and the tool and thus prevents polarization and accompanying increase in the resistance of the cell. At the same time, the circulation of electrolyte assists in cooling the cell and preventing overheating of the work piece.

In this mode of operation, the bipolar operation furnishes a convenient means for getting electric current into the work piece without requiring the welding of a heavy conductor to the work piece. Inasmuch as the work piece is generally thin in the direction through which the current flows from one face to the other the electronic resistance and I²R heating of the work piece are minimized. Also, the electrode 31 can be spaced closely to the work piece so that the resistance of the electrolyte between the electrode or tool 31 and the work piece surface 35 is minimized. The close spacing assures high velocity of flow and proper carrying away of the gases generated by electrolysis. The spacing preferably is kept large enough, however, to provide enough ballast resistance to protect the active surface 34 of the work piece from damage if it should accidentally make contact with the advancing tool 30.

In a preferred mode of operation of the apparatus shown in FIGURES 1 and 2, a work piece such as molybdenum blade blank B is secured to the closure member 22 and the closure member secured to the side wall 18 of the cell 11, with the blank extending transversely of the cell disposed generally vertically. Electrode tools 30 and 31 having the desired air foil configuration and composed of, for example, stainless steel with about a thousandth of an inch thick deposit of nickel on the working surfaces of the tools are secured to the backing plates 40 and 41 and carefully positioned in correct relationship to the blank and to each other. The tools are advanced to positions close to the work piece; for example, about 0.030 inch at the closest points. The limit switches are positioned to stop the advance of the tools when they have penetrated to the desired point. Electrolyte is then circulated at a rate of from about 20 to 250 feet per minute between the surfaces of the tool and the work piece. A voltage sufficient to give a current density of about 50 amperes per square inch in the zones where the tools most closely approach the work is supplied, the total voltage across the cell being of the order of about 15 volts. The tools are advanced toward the work at a rate commensurate with the rate of dissolution of the work piece; for example about 0.006 inch per minute. The polarity of the tools is periodically reversed, for example, at a rate of three complete cycles per minute, that is the tools are alternately anodes and cathodes for periods of ten seconds, or at higher rates, as where ordinary 60 cycles alternating current is utilized. The operation is continued until the tool supports 62 and 65 engage the limit switches 61 and 63, respectively, whereupon the motors 58 and 71 are automatically stopped. The current is then turned off, the circulation of electrolyte is stopped and the blank having the desired contours therein is removed from the apparatus.

An operation of this general character is extremely advantageous since electrical conduction through the blade is not a problem. The electrical resistance of the blank is equal to the resistivity of the metal times the ratio of length of path to cross sectional area. In the bipolar operation the length of path is simply the blade thickness and the cross sectional area is the area of the blade being shaped. Thus, the ratio is very small and the resistance of the blade in the direction of conduction perpendicular to the blade axis is correspondingly small. For this reason the voltage drop through the blade is not a problem, and I²R heating of the blade is minimized. Also, since no electrical connection to the blade is required there is no problem of welding a conductor to the blade and no concern about anodic action on a conductor welded to the blades. The blade holding fixture can be very simple inasmuch as the entire blade is enclosed within the electrolytic cell, whereas with previous methods and apparatus the conductor leading to the blade must extend through the wall of the cell, thus creating a leakage problem.

The preferred apparatus is very flexible in operation. The frequency of the cycle can be varied over a wide range depending upon materials and conditions. If desired, one tool can be advanced toward the work piece at a rate greater than the rate of advance of the other tool. Where the tools are advanced at substantially different rates the reversal cycle may be made unsymmetrical as by unequal time shaving. The rate of circulation of electrolyte can be controlled readily to substantially balance the pressure within the cell so that there are no substantial net pressures tending to deflect the blank B or the partitions 27 and 28. In some operations one tool may complete its work before the other tool. In such cases, the motor advancing the one tool is shut off, the electrolyte flow is continued and the reversing cycle changed so that the tool that has completed its work is always the anode in the cell. The surface on which the machining has been completed is then a cathode and is not subject to further erosion, while the machining can be continued on the other side of the work piece with the other tool which is constantly the cathode of the cell.

The reverse cycling method is of advantage electrolytically for the reason that the polarity reversal depolarizes the electrode tools as well as the surfaces being machined. The periodic depolarization makes the resistance of the electrolyte the primary influence on the current density at given points on the work; this resistance varies with the distance between the work piece and the electrode tool. Therefore, the current density is greatest and the metal is removed most rapidly at the points where the tool approaches the work most closely and the ultimate result is that the contour of the work piece conforms more precisely to the contour of the tool when the electrolysis is completed.

A further advantage is found in the fact that in electrolytic machining operations it is desirable to maintain the gap between the electrode tool and the work at a minimum, for example, from between 0.003 to 0.030 inch, with the smaller gap being preferred for the sake of accuracy and efficiency. It occasionally happens that one of the tools makes contact with the work piece. In ordinary electrolytic machining operations such contact results in a very heavy current flow and arcing between the work piece and the tool which may damage the work piece and the tool and also the electrical equipment. With the bipolar system it is unlikely that both tools will contact the work piece at the same time. If one tool should contact the work piece the possibility of damage is greatly reduced by the fact that the impedance of the other half of the electrolytic cell remains in the electric circuit. This impedance limits the current flow to less than twice the normal current flow, which ordinarily will not cause serious damage. An indication of touching of one tool to the work piece can be given by an ammeter and a current sensitive relay set to disconnect the power source when the current exceeds the predetermined value, or other current means can be used automatically to control the apparatus and stop it if one tool should engage the work piece. As explained above, the bipolar electrolytic machining principle can be applied to various types of operations, for example, in die sinking, two die blanks can be placed back to back in a cell of the general type shown in FIGURES 2 and 3 and two die cavities formed in them simultaneously. Also, a single die cavity can be formed in a blank using the bipolar principle to supply current to the blank and utilizing direct current.

Figure 5:
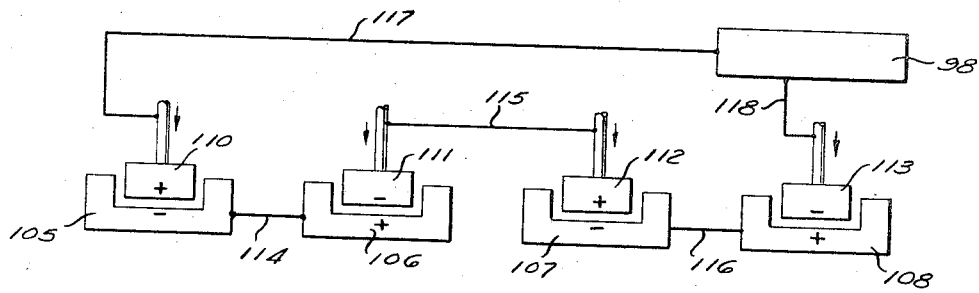
FIGURES 5, 6, 7, and 8 diagrammatically illustrate adaptations of the present invention to different types of electro-machining operations.

FIGURE 5 shows diagrammatically an arrangement for multiple electromachining in which several die cavities are sunk simultaneously. Here the current is supplied by a suitable source 98 as before and cavities are sunk in die blanks 105, 106, 107, and 108 by means of tools 110, 111, 112, and 113. Electrolyte is supplied in the manner previously described or in any other convenient manner to the parts, and the tools are advanced at the desired rate by appropriate mechanisms. Die blanks 105 and 106 are connected together by conductor 114. Tools 111 and 112 are connected together by conductor 115 and die blanks 107 and 108 are connected together by conductors 116. Tools 110 and 113 are connected to the power source 98 by conductors 117 and 118. In this arrangement the current is reversed periodically; the polarities indicated on the drawing, of course, are all simultaneously reversed at each reversal of current. Die blanks 105 and 106 connected together by conductor 114 may be considered as a bipolar electrode. Tools 111 and 112 connected together by conductor 115 may be considered as another bipolar electrode and die blocks 107 and 108 connected by conductor 116 may be considered as a third bipolar electrode. Thus, the system may be considered as comprising two uni-polar electrodes 110 and 113 and three bipolar electrodes making a total of five. It will be evident that more or fewer die blanks and tools may be employed but an even number of die blanks and tools should be used although the total number of electrodes may be odd. This arrangement is advantageous from a standpoint of equipment cost because a higher voltage source may be employed and because a single source can be utilized for a plurality of operations.

Figure 6:
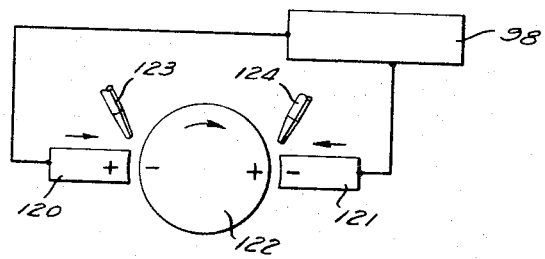

FIGURE 6 shows an adaptation of the bipolar principle to an electrolytic turning operation. Here the source 98 supplied current to tools 120 and 121 which are advanced slowly toward the rotating work piece 122. The work piece constitutes a bipolar electrode. Electrolyte may be supplied to the work by nozzles 123 and 124 or electrolyte may be pumped through hollow tools if desired. In either event, the work is simultaneously a cathode and an anode and erosion takes place at the part of the work piece that is the anode. The current can be periodically reversed if desired, or unidirectional current can be employed inasmuch as the rotation of the work makes each element of the work alternately a cathode and an anode as it moves from a position adjacent electrode 120 to a position adjacent electrode 121. In any event the arrangement is such that it is unnecessary to use slip rings or other means to supply electric current to the work piece.

Figure 7:
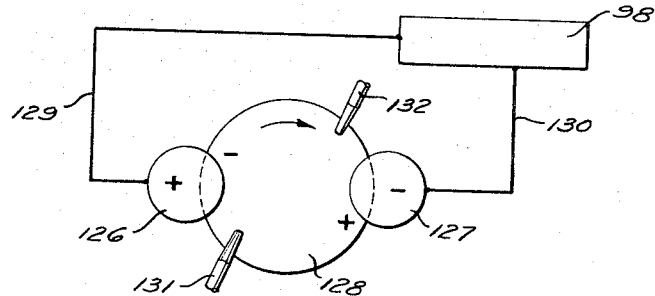

A somewhat similar arrangement except that the tool is the bipolar electrode is illustrated in FIGURE 7. Here the source 98 supplies current to work pieces 126 and 127 which are advanced by appropriate means toward a bipolar disc electrode 128 that may be used for a cutting off operation carried out in accordance with the disclosure of application Ser. No. 855,678. The arrangement and operation in FIGURE 7 differ from those in the other figures in that the bipolar electrode 128 is provided with a surface that does not dissolve chemically or anodically in the electrolyte that is used, so that the bipolar electrode 128 functions as a tool rather than as a work piece. The work pieces are connected to the power source by conductors 129 and 130 and electrolyte may be supplied to the disc through nozzles 131 and 132 and carried by the disc under the influence of centrifugal force into the working zone. The current source 98 supplies AC or periodically reversed DC, and the work pieces are cut simultaneously. This again eliminates the need of supplying the heavy electrolysis current to the rotating disc and eliminates slip rings, brushes and the like from the machine.

Figure 8:
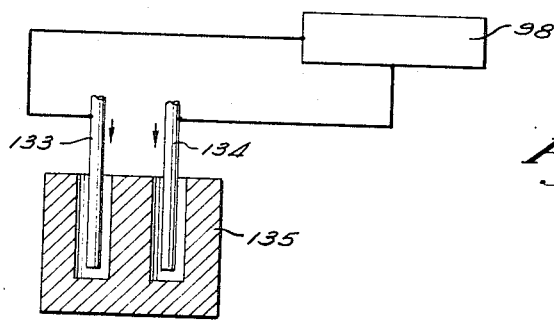

The simultaneous drilling of two holes in a work piece is illustrated in FIGURE 8. The current source 98 supplied AC or periodically reversed DC to tubular electrode tools 133 and 134. Electrolyte is pumped through the tools, and the tools are advanced toward the work piece 135 which constitutes a bipolar electrode. As the tools are advanced, holes are drilled as shown, by electrolytic erosion of the work.

I claim:

1. Apparatus for electrolytically removing material from two surfaces composed of an electrically conductive material comprising a first electrode and a second electrode, both said electrodes having surfaces in contact with an electrolyte, a bipolar electrode interposed between said first and second electrodes and having a first surface juxtaposed to but out of contact with said surface of said first electrode and a second surface juxtaposed to but out of contact with said surface of said second electrode, means for supporting said bipolar electrode without direct electrical contact between it and said first and second electrodes, two of said surfaces constituting tool surface and two of said surfaces constituting work piece surfaces, said tool surfaces being composed of material that is substantially free from electrolytic or chemical dissolution in said electrolyte and being adapted to provide predetermined shapes in said work piece surface by electrolytic removal of material therefrom, means for causing electrolyte to flow between said juxtaposed surfaces, said work piece surfaces being composed of a material susceptible to electrolytic dissolution in said electrolyte when made anodes therein, electric circuit means for supplying a periodically reversing current to said first and second electrodes to make said surfaces alternately anodes and cathodes, current being supplied to said bipolar electrode solely through said electrolyte, and means for advancing said juxtaposed surfaces toward each other.

2. Apparatus according to claim 1 wherein said electric circuit means supplies alternating current of ordinary commercial frequency to said first and second electrodes.

3. Apparatus according to claim 1 wherein said electric circuit means comprises a source of direct current and switching means for periodically reversing the current supplied to said first and second electrodes.

4. Apparatus according to claim 1 wherein the surfaces of said first and second electrodes in contact with the electrolyte constitute tool surfaces and the surfaces of said bipolar electrode constitute work piece surfaces.

5. Apparatus according to claim 1 wherein said surfaces of said first and second electrodes constitute work piece surfaces and said surfaces of said bipolar electrode constitute tool surfaces.

6. Apparatus according to claim 1 wherein said bipolar electrode constitutes a work piece that is rotated between said first and second electrodes.

7. Apparatus according to claim 1 wherein said first and second electrodes constitute work pieces and said bipolar electrode constitutes a rotating disc.

8. Apparatus according to claim 1 wherein said first and second electrodes constitute tubular members and said bipolar electrode is a work piece, electrolyte being supplied through said tubular members.

9. Apparatus for electrolytically removing material from a workpiece composed of an electrically conductive material comprising a first electrode and a second electrode connected to an electric circuit for creating a difference in potential between said first and second electrodes, both said electrodes having surfaces in contact with an electrolyte and composed of material that is substantially free from electrolytic or chemical dissolution in said electrolyte, said workpiece constituting a bipolar electrode disposed between said first and second electrodes in the electric circuit and having a first surface portion juxtaposed to said surface portion of said first electrode and a second surface juxtaposed to said surface of said second electrode; means for supporting said workpiece without direct electrical contact between it and said first and second electrodes whereby current is supplied to said workpiece solely through said electrolyte from said first and second electrodes, said surface of said first electrode constituting a tool surface, said tool surface being adapted to provide a predetermined shape in the juxtaposed surface portion of said workpiece by electrolytic removal of material therefrom; means for rotating said bipolar electrode workpiece between said first and second electrode surfaces; means for causing electrolyte to flow between said juxtaposed surfaces of said electrodes and said workpiece, said workpiece surface portion being composed of a material susceptible to electrolytic dissolution in said electrolyte when made the anode therein, and means for advancing said juxtaposed surfaces toward each other.

10. Apparatus according to claim 9 wherein said electric circuit includes a source of direct current.

11. Apparatus according to claim 10 wherein said first electrode is connected as the cathode and said second electrode is connected as the anode in said circuit, and wherein a gap is maintained between said surface of said second electrode and said second surface of said workpiece to provide a ballast resistance protecting said first surface of said workpiece from damage in the event of contact with said juxtaposed surface of said first electrode.

12. Apparatus for electrolytically removing material from two oppositely disposed surfaces of an electrically conductive workpiece to provide said surfaces of said workpiece with predetermined three dimensional contours and shapes comprising in combination: two electrically conductive tools, each said tool having a face portion having a contour and shape corresponding substantially to the said predetermined contour and shape with which one of said surfaces of said workpiece is to be provided; electrically insulating means for supporting said workpiece; means for supporting each said tool in close proximity to but out of contact with one of said surfaces of said workpiece and for advancing each said tool relative to the juxtaposed surface; means enclosing at least the face portions of said tools and the surfaces of said workpiece and thereby providing enclosed passages for electrolyte between the face portions of said tools and said surfaces of said workpiece; means for supplying an electrically conductive electrolyte under pressure to said passages for flowing said electrolyte under pressure throughout said passages between the face portions of said tools and said surfaces of said workpiece throughout the entire area thereof, said portions of said tools being composed of material that is substantially free from electrolytic or chemical dissolution in said electrolyte, and circuit means for supplying a periodically reversing current to said electrode tools to make said tools alternately anodes and cathodes, current being supplied to said workpiece solely through said electrolyte from said tools, whereby said workpiece is constituted a bipolar electrode disposed between said electrode tools.

13. Apparatus according to claim 12 wherein means are provided for separating the flow of electrolyte on one side of said workpiece from the flow of electrolyte on the other side of said workpiece.

14. Apparatus according to claim 13 wherein independent means are provided for controlling the flow of electrolyte in said passages.

15. Apparatus according to claim 14 having independent means for advancing said tools toward said workpiece and independent means for controlling the rate of advance of said tools.

16. Apparatus for electrolytically removing material from two oppositely disposed surfaces of an electrically conductive workpiece to provide said surfaces of said workpiece with predetermined three dimensional contours and shapes comprising in combination: two electrically conductive tools, each said tool having an imperforate face portion having a three dimensional contour, shape and area corresponding substantially to the said predetermined three dimensional contour and shape with which one of said surfaces of said workpiece is to be provided; means for supporting said workpiece without direct electrical contact between it and said tools; means for supporting each said tool in close proximity to but out of contact with one of said surfaces of said workpiece and for advancing each said tool relative to the juxtaposed surface in a straight line generally transverse to said surface; means enclosing at least the face portions of both said tools and the surfaces of said workpiece and thereby providing enclosed passages for electrolyte between the face portions of said tools and said surfaces of said workpiece, said enclosing means having an inlet for electrolyte disposed beyond the periphery of said surfaces and an outlet for electrolyte also disposed beyond the periphery of said surfaces and spaced from said inlet whereby electrolyte flowing from said inlet to said outlet flows across said surfaces in directions generally parallel thereto; means for supplying an electrically conductive electrolyte under pressure to said inlet and for flowing said electrolyte under pressure throughout said passage between the face portions of said tools and said surfaces of said workpiece throughout the entire area thereof only in directions generally parallel to said surface and transverse to the direction of movement of said tools, said face portions of said tools being composed of material that is substantially free from electrolytic or chemical dissolution in said electrolyte, and circuit means for supplying a periodically reversing current to said electrode tools to make said tools alternately anodes and cathodes, current being supplied to said workpiece solely through said electrolyte, whereby said workpiece is constituted a bipolar electrode disposed between said electrode tools.

17. A method of electrolytically removing material, in a single operation, from two workpiece surfaces composed of electrically conductive material subject to anodic dissolution comprising disposing an electrode tool having a surface adapted to provide a desired shape in a workpiece surface in juxtaposition to but out of contact with each workpiece surface, causing an electrolyte to flow in the spaces between said juxtaposed surfaces under pressure and at a rate sufficient to rapidly replenish the electrolyte between said surfaces whereby there are two workpiece surfaces and two tool surfaces in contact with electrolyte, said tool surfaces being composed of material that is substantially free from electrolytic or chemical dissolution in said electrolyte, connecting two of said surfaces to a source of periodically reversing current, whereby each surface is alternately an anode and a cathode, the other two surfaces being connected together whereby said other two surfaces together constitute a bipolar electrode electrically interposed between said surfaces that are connected to said source of periodically reversing current and each surface of which is alternately an anode and a cathode and supplying current to said bipolar electrode so constituted solely by flow through said electrolyte from said surfaces that are connected to said source of periodically reversing current, whereby the workpiece surfaces are subject to electrolytic erosion during the times that they are anodes.

18. A method according to claim 17 wherein the workpiece surfaces are electrically connected together to constitute the bipolar electrode.

19. A method according to claim 17 wherein said tool surfaces are electrically connected together to constitute the bipolar electrode.

20. A method according to claim 17 wherein alternating current of commercial frequency is supplied to said tool and said workpiece.

21. A method according to claim 17 wherein the frequency of reversal of said current is substantially less than the frequency of commercial current supplies.

22. A method according to claim 17 wherein said juxtaposed surfaces are advanced toward each other as material is removed from said workpiece surfaces.

23. A method according to claim 17 wherein said electrolyte is supplied under pressure to the space between said juxtaposed surfaces.

24. A method of electrolytically removing material, in a single operation, from two workpiece surfaces composed of electrically conductive material subject to anodic dissolution, comprising disposing an electrode tool having a surface adapted to provide a desired shape in a workpiece surface in juxtaposition to but out of contact with each workpiece surface, causing an electrolyte to flow in the spaces between said juxtaposed surfaces under pressure and at a rate sufficient to rapidly replenish the electrolyte between said surfaces whereby there are two workpiece surfaces and two tool surfaces in contact with the electrolyte, said tool surfaces being composed of material that is substantially free from electrolytic or chemical dissolution in said electrolyte, connecting said two tool surfaces to a source of periodically reversing current, whereby each tool surface is alternately an anode and a cathode, said two workpiece surfaces being electrically interconnected thereby constituting a bipolar electrode interposed between said tool surfaces, and supplying current to said bipolar electrode so constituted solely by flow through said electrolyte from said tool surfaces whereby the workpiece surfaces are subject to electrolytic erosion during the time that they are anodes.

References Cited

UNITED STATES PATENTS

| | | | |
|---|---|---|---|
| 2,532,907 | 12/1950 | Hangosky | 204—224 |
| 2,577,644 | 12/1951 | Bartlett | 204—224 |
| 2,590,927 | 4/1952 | Brandt et al. | 204—143 |
| 3,036,967 | 5/1962 | Lapham | 204—225 |
| 3,041,265 | 6/1962 | Williams | 204—224 |
| 3,058,895 | 10/1962 | Williams | 204—143 |
| 3,080,310 | 3/1963 | Lindenmaier et al. | 204—225 |
| 3,088,889 | 5/1963 | La Boda et al. | 204—143 |
| 3,095,364 | 6/1963 | Faust et al. | 204—143 |

FOREIGN PATENTS 870,661   6/1961   Great Britain.

JOHN H. MACK, *Primary Examiner.*

R. GOOCH, R. K. MIHALEK, *Assistant Examiners.*